United States Patent
Talley et al.

(10) Patent No.: US 6,442,924 B1
(45) Date of Patent: Sep. 3, 2002

(54) OPTIMIZED STEAM TURBINE PEAKING CYCLES UTILIZING STEAM BYPASS AND RELATED PROCESS

(75) Inventors: Robert Sean Talley, Ballston Lake; John Raymond Hawley, Schenectady, both of NY (US); Bruce Lockheart Morrison, Fernandina Beach, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/593,277

(22) Filed: Jun. 13, 2000

(51) Int. Cl.$^7$ ................................................. F02G 3/00
(52) U.S. Cl. ................................. 60/39.02; 60/39.182
(58) Field of Search ........................... 60/39.02, 39.181, 60/39.182; 122/76

(56) References Cited

U.S. PATENT DOCUMENTS

| | | |
|---|---|---|
| 3,879,616 A | 4/1975 | Baker et al. |
| 4,207,864 A | 6/1980 | Fischer et al. |
| 4,329,592 A | 5/1982 | Wagner et al. |
| 5,577,355 A | 11/1996 | Tomlinson |
| 5,628,179 A | 5/1997 | Tomlinson |
| RE36,497 E | 1/2000 | Tomlinson |
| RE36,524 E | 1/2000 | Tomlinson |
| 6,230,480 B1 * | 5/2001 | Rollins, III ............... 60/39.182 |

* cited by examiner

*Primary Examiner*—Charles G. Freay
(74) *Attorney, Agent, or Firm*—Nixon & Vanderhye P.C.

(57) ABSTRACT

A combined cycle power plant includes a gas turbine, a steam turbine and a heat recovery steam generator having a duct burner for supplementary firing. In the unfired mode, gas turbine exhaust is used in the heat recovery steam generator for generating steam for the steam turbine. The power plant includes a main steam output line from the heat recovery steam generator connected to the first stage inlet of the high pressure section of the steam turbine. A bypass loop is connected either to an intermediate pressure connection of the HRSG or from the high pressure line to an admission point downstream of the high pressure inlet nozzle, at a lower pressure than the nominal inlet pressure. By operating the bypass system in conjunction with the duct burning process in the HRSG, the steam inlet pressure to the steam turbine can be maintained at the optimal level during both fired and unfired operation of the HRSG. Another potential benefit is a higher output during fired operation than could otherwise be accomplished with a given steam turbine.

11 Claims, 7 Drawing Sheets

OPTIMIZED STEAM TURBINE PEAKING CYCLES UTILIZING STEAM BYPASS AND RELATED PROCESS

BACKGROUND OF THE INVENTION

This invention relates to combined cycle power plants and, specifically, to a bypass arrangement that allows increased output at peak periods, but also retains optimum performance during non-peak periods.

Until recently, bottoming cycle design for combined cycle power plants was relatively straightforward. The gas turbine (s) generated a predictable amount of waste heat. Heat Recovery Steam Generators (HRSGS) converted a percentage of that waste heat to steam for re-admission into an appropriately sized steam turbine. During the last few years, however, shortages of generating capacity have caused spot prices to rise by several dollars per KWhr. As a result, owners and developers have turned to the plant designers to develop ways to generate more power during the peak periods. The result has been plant designs that include duct burners in the HRSGs which can be "fired" during peak periods to generate supplemental power. These designs have solved the problem of generating substantial peak power in a manner that produces lower capital cost requirements and better heat rates than can be achieved by adding simple cycle gas turbines to the grid.

Inclusion of duct burner firing to accomplish higher output "peaking" operation of the combined cycle plant, however, introduces a "hidden" higher cost. That cost results from operating the steam turbine at lower than rated inlet pressure, and thus a "non-optimal" lower pressure during "non-peaking" (unfired) operation. This pressure can be several hundred pounds per square inch (psi) lower than the rated (optimal) level for highest output during the non-fired periods of the year. These penalties can be substantial if the steam turbine is only operating in fired (peak) mode for a fraction of the year, while operating in an unfired, pure combined cycle mode (i.e., without the supplemental duct burner firing) for the remaining majority of the year. Heat rate penalties in the 25–50 BTU range can result in lower output, equating to several million dollars of Net Present Value lost due to the reduced nominal power output.

BRIEF SUMMARY OF THE INVENTION

In order to hold the inlet pressure relatively constant during large swings in HRSG output, a bypass arrangement is incorporated that includes steam piping that runs from the HRSG to alternate steam turbine admission point(s) that are one or more stages downstream from the nominal high pressure inlet nozzle.

During base load operation (unfired HRSG in a non-peak period), the steam turbine operates at its rated inlet pressure at optimum output, with the bypass system closed. As duct burner firing in a peak period commences, the supplemental firing and bypass systems are opened and steam is admitted to the steam turbine through the admission connection. The extra steam flow produces more torque and hence output. Since the flow is admitted downstream of the steam turbine high pressure inlet at a lower pressure, the inlet continues to operate at its rated pressure. When the unit is switched back to base load operation, the bypass system is again closed and the cycle repeats itself with the steam turbine operating at rated pressure (optimum) while base loaded. Thus, depending upon the construction of the steam turbine, a higher peak output may be possible through the bypass arrangement, than through the more typical "sliding pressure" inlet configuration as explained further herein.

Accordingly, in its broader aspects, the invention relates to a combined cycle power plant comprising a gas turbine driving a first generator; a steam turbine driving a second generator, the steam turbine having a low pressure section, an intermediate pressure section and a high pressure section; a heat recovery steam generator arranged to receive exhaust gas from the gas turbine and condensate from the steam turbine, and to utilize heat from the gas turbine exhaust to convert condensate from the steam turbine back to steam, the heat recovery steam generator having means for supplying steam to the high pressure, intermediate pressure and low pressure sections of the steam turbine; the heat recovery steam generator further comprising a duct burner for supplying supplemental steam to the steam turbine; wherein the supplemental steam is supplied to the steam turbine downstream of the high pressure inlet to the high pressure section.

In another aspect, the invention relates to the combined cycle plant of claim 3 wherein said supplemental steam is mixed with hot reheat steam from a drum in said heat recovery steam generator prior to admission into said intermediate pressure section.

DETAILED DESCRIPTION OF THE INVENTION

Figure 1:
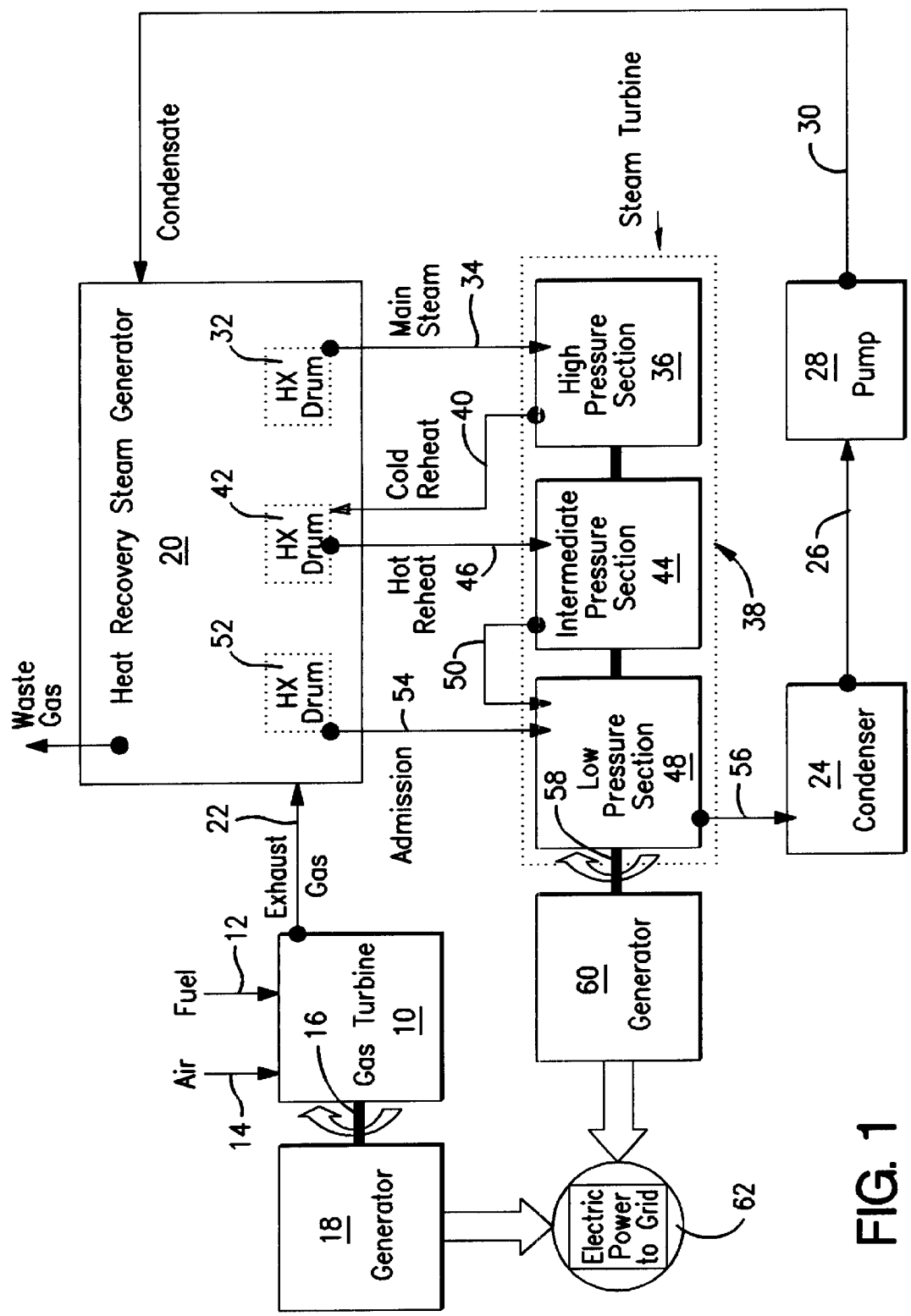
FIG. 1 depicts a schematic block diagram of a typical combined cycle power plant.

FIG. 1 is a typical schematic block diagram of a combined cycle power plant. Fuel and air are supplied to a gas turbine 10 via streams 12 and 14, respectively. The fuel/air mixture is combusted and the resulting energy release is harnessed in such a way as to rotate the gas turbine shaft 16. That shaft is attached, either directly or indirectly, to a shaft of a generator 18 such that torque transmitted through the turbine shaft to the generator, drives the generator, producing electricity.

Exhaust heat from the gas turbine is introduced into a heat recovery steam generator (HRSG) 20 via stream 22, where it is used to convert water from a steam turbine condenser 24 into steam for re-admission into the steam turbine 38. Specifically, the water from the condenser 24 is introduced into the HRSG 20 via stream 26, pump 28 and stream 30.

Steam generated in the high pressure drum 32 (also called the main steam) is introduced into the inlet of the high pressure (HP) section 36 of the steam turbine 38 via stream 34. The temperature and pressure of the steam decreases as it flows through the HP section 36 until it exits via the cold reheat piping or stream 40. The cold reheat piping directs the steam to the HRSG 20 where additional heat energy is added in the drum 42. This higher energy steam, called hot reheat steam, is directed to the inlet of the intermediate pressure (IP) section 44 of the steam turbine 38 via stream 46. Steam temperature and pressure decrease as the steam flows through the IP section 44 and into the low pressure (LP) section 48 of the steam turbine via stream 50. Steam from drum 52 in the HRSG 20, also called admission steam, is supplied to the LP section 48 via stream 54. After passing through and exiting the LP section 48, the steam enters the condenser 24 via stream 56 where it is cooled below its boiling point and becomes water. The water is piped to the pump 28 that, in turn, returns the water to the HRSG 20 to begin the steam generation cycle again.

The steam turbine 38 is designed such that the energy released by reducing the steam temperature and pressure within each turbine section is used to rotate the steam turbine shaft 58. That shaft is attached, either directly or indirectly, to the shaft of a second generator 60 such that torque transmitted through the turbine shaft drives the generator. Thus, both generators 18 and 60 supply electric power to a grid 62.

The total energy that is introduced into the steam turbine 38 is generally characterized by three parameters: steam mass flow rate, steam pressure, and steam temperature. Maximum allowable steam temperature is typically limited by material considerations. Maximum allowable steam pressure is typically limited by mechanical design considerations. Maximum allowable steam mass flow rate is typically limited by the configuration of the steam turbine and piping geometries. All of these factors are considered by the combined cycle and steam turbine designers to match energy delivered to the steam turbine with energy available from the gas turbine exhaust gases.

Figure 2:
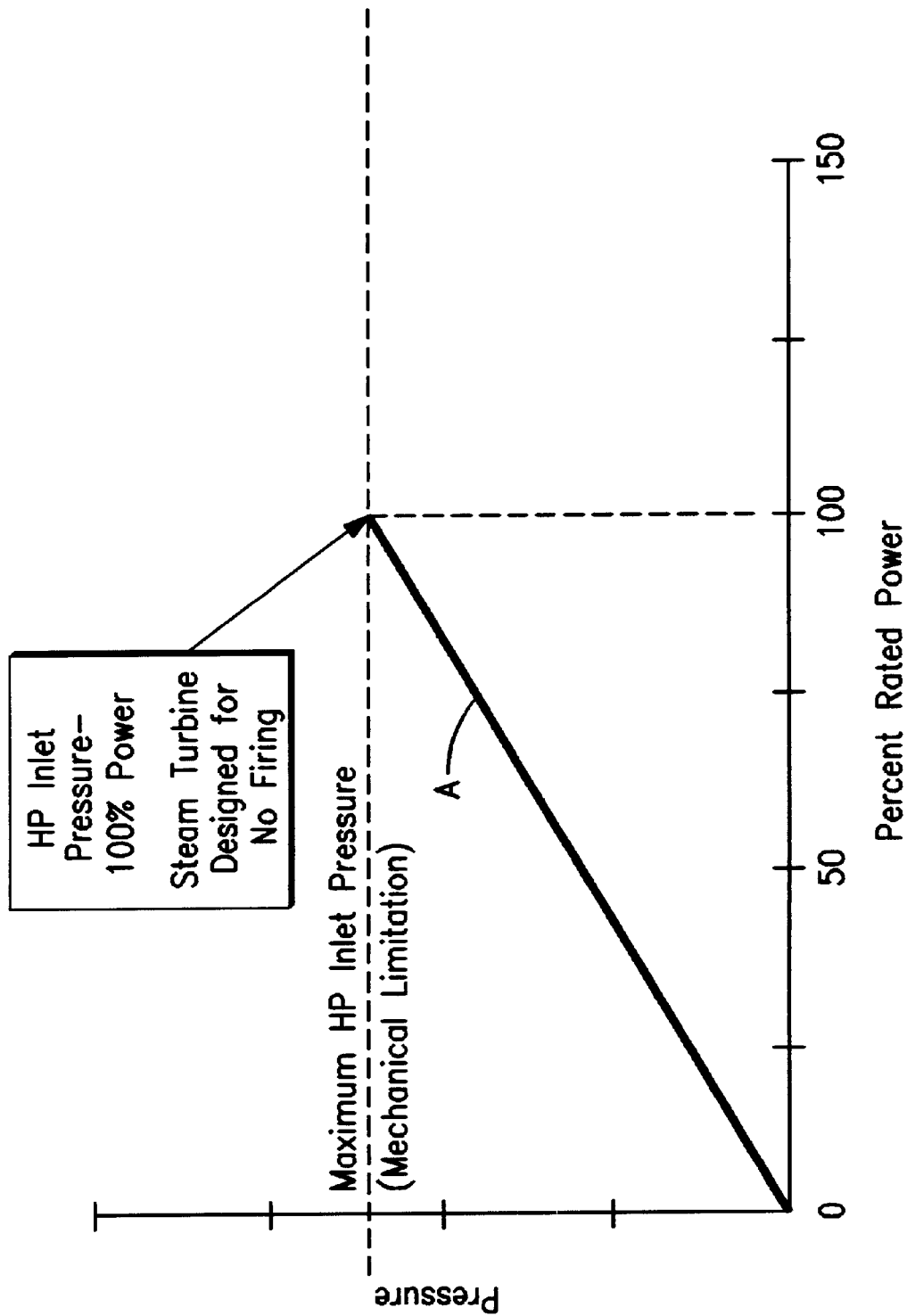
FIG. 2 is a diagram illustrating the relationship between power output and steam turbine high pressure section inlet pressure for a sliding pressure combined cycle power plant with no supplemental firing capability.

One design philosophy results in a "sliding pressure" approach to steam turbine operation. The maximum HP inlet pressure is established by the given design configuration, the HP steam inlet temperature is constant at the maximum allowable, and the steam turbine flow path geometry is optimized for maximum efficiency at some suitable operating condition such as 100% operation. With temperature and geometry thus fixed, pressure must be increased to force an increased amount of flow through the steam turbine flow path in order to bring the steam turbine portion of the power plant from startup to 100% rated power. The resulting relationship between inlet pressure and power output between 0% and 100% rated steam turbine power is approximately linear, as shown by line A in FIG. 2.

Figure 3:
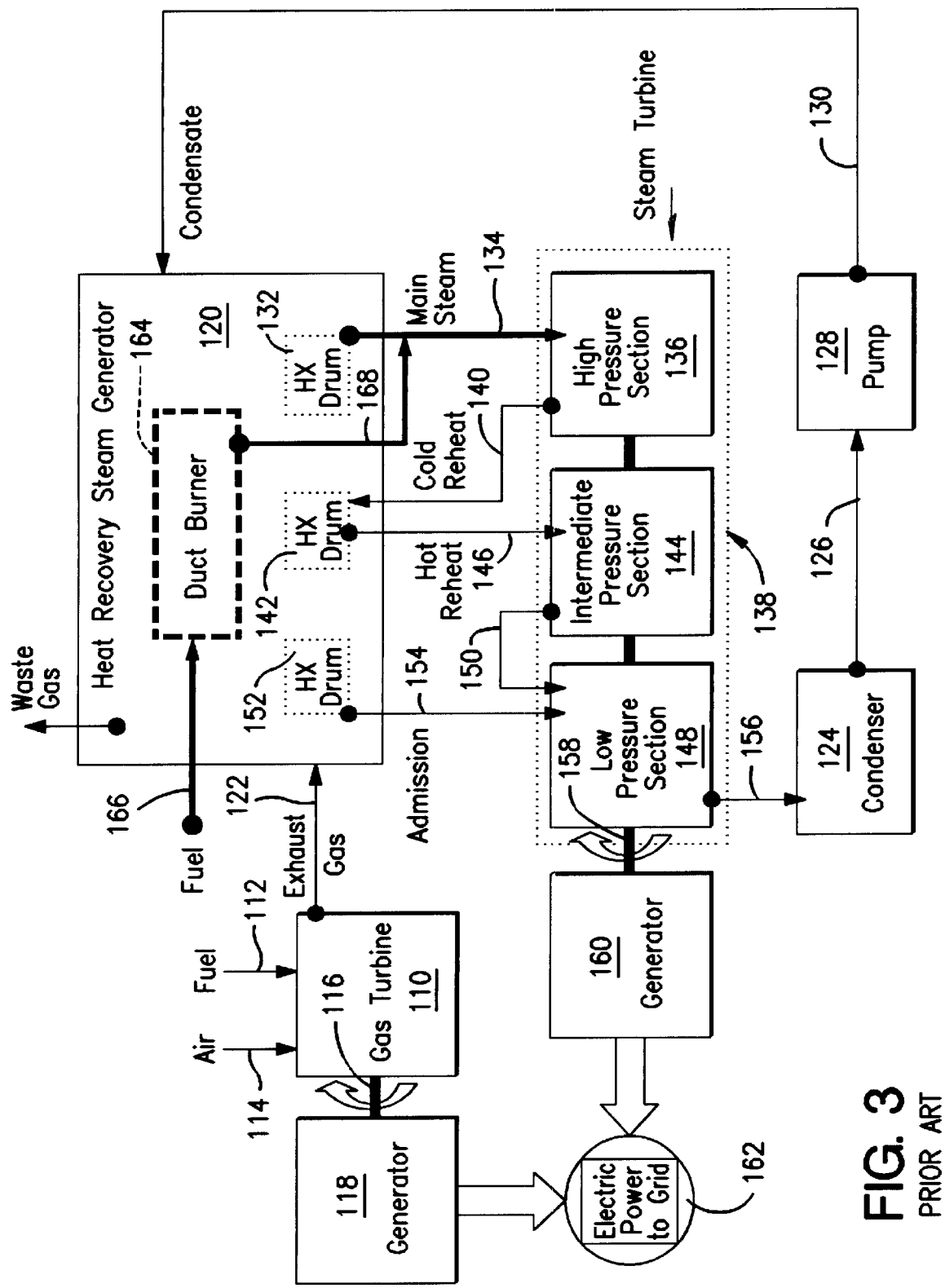
FIG. 3 depicts a schematic block diagram of a combined cycle power plant with supplemental firing capability.
Figure 4:
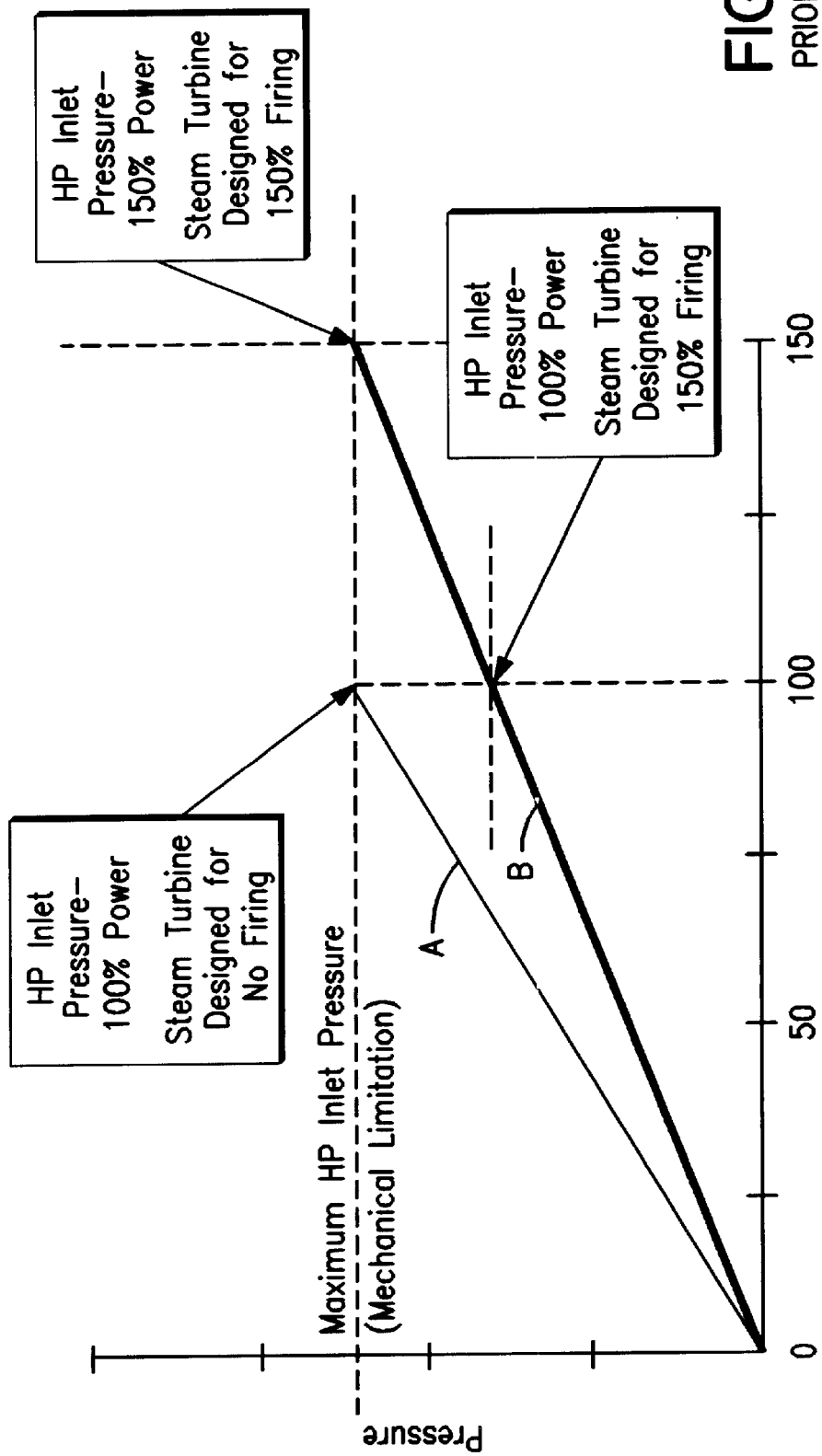
FIG. 4 is a diagram illustrating the relationship between power output and steam turbine high pressure section inlet pressure for a sliding pressure combined cycle power plant with supplemental firing capability.

With reference to FIG. 3, one common way to increase steam turbine power output beyond the 100% rating point (to meet, for example, peak grid demands) is to utilize a supplemental duct burner 164 (supplied with fuel via stream 166) in the HRSG 120 to temporarily increase the mass flow rate and total energy content of the steam. In FIG. 3, reference numerals are used that are similar to those used in FIG. 1, but with the prefix "1" added, for designating corresponding components. As such, the corresponding components need not be described again. As shown in FIG. 3, supplemental steam generated by the duct burner 164 is combined via stream 168, with the "conventional" steam (the main steam) produced in the HRSG 120 from the gas turbine exhaust and introduced into the HP steam turbine section 136 of the steam turbine via stream 134. This additional steam flow can not be accommodated by continued sliding of the HP inlet pressure (line A) beyond the 100% power pressure level, however, as this would violate the maximum HP inlet design pressure (see FIG. 2). Accordingly, steam turbine operation is typically modified as shown in FIG. 4. Specifically, the steam turbine must be redesigned to establish a pressure/flow relationship (line B) that provides maximum HP inlet pressure at the maximum anticipated power output with supplemental duct firing. (FIG. 4 assumes a 150% maximum output level, but this level is for illustration and discussion only. Actual maximum output level is determined for each individual combined cycle power plant and is a function of many parameters including anticipated power demand, duct burner and HRSG limits, etc.) As shown in FIG. 4, this modified steam turbine design is also operated in a sliding pressure mode, with HP inlet pressure varying linearly from zero to the maximum allowable as power output increases from 0% to the maximum 150% supplementary fired power level.

Supplemental duct firing is typically used to meet short duration peak demand for increased power output. There is, however, an impact on nominal 100% operation associated with introducing this peaking capability. As apparent from FIG. 4, the 100% power HP inlet pressure is reduced for the supplemental fired turbine relative to the 100% power HP inlet pressure for the unfired turbine design. This relationship can be expressed as:

$$P_{(100\% \text{ power,HP inlet) fired}} = P_{(100\% \text{ power HP inlet) unfired}} * \frac{(100\% \text{ Power})}{(\text{Max Fired Power})}$$

Maximum achievable efficiency for a given steam turbine configuration generally increases as HP inlet pressure increases. Accordingly, introduction of supplemental duct firing to the sliding pressure combined cycle power plant increases maximum short term (peaking) power output but tends to reduce overall steam turbine and power plant efficiency at nominal 100% operating conditions, as indicated in the comparison of lines A and B in FIG. 4.

In accordance with this invention, a bypass system is provided which redirects the steam produced by supplemental duct firing to (1) permit maximum peaking power output and (2) retain high efficiency at nominal 100% power operation.

Figure 5:
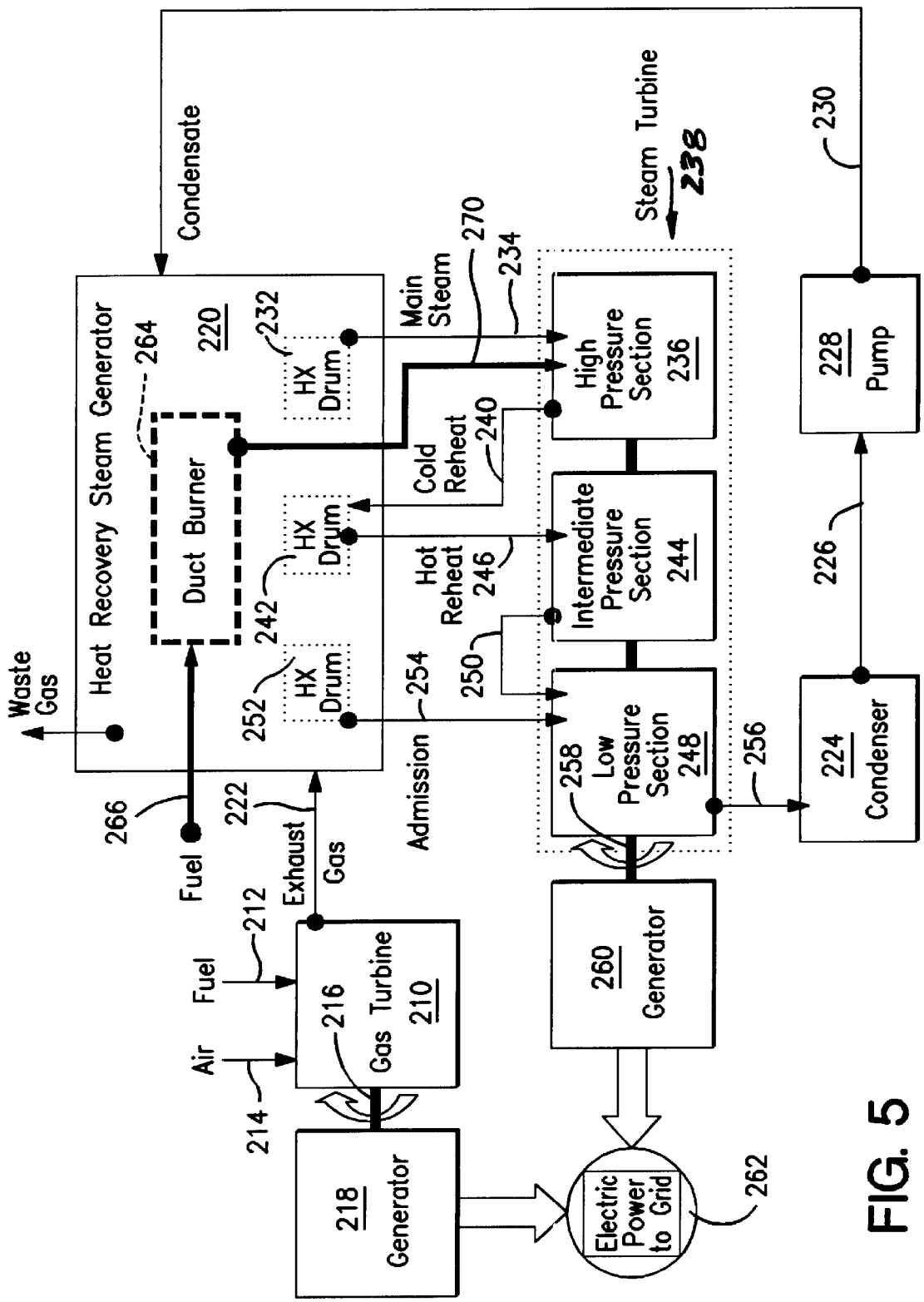
FIG. 5 is a schematic block diagram of a combined cycle power plant with supplemental firing capability and bypass system in accordance with a first embodiment of the invention.
Figure 6:
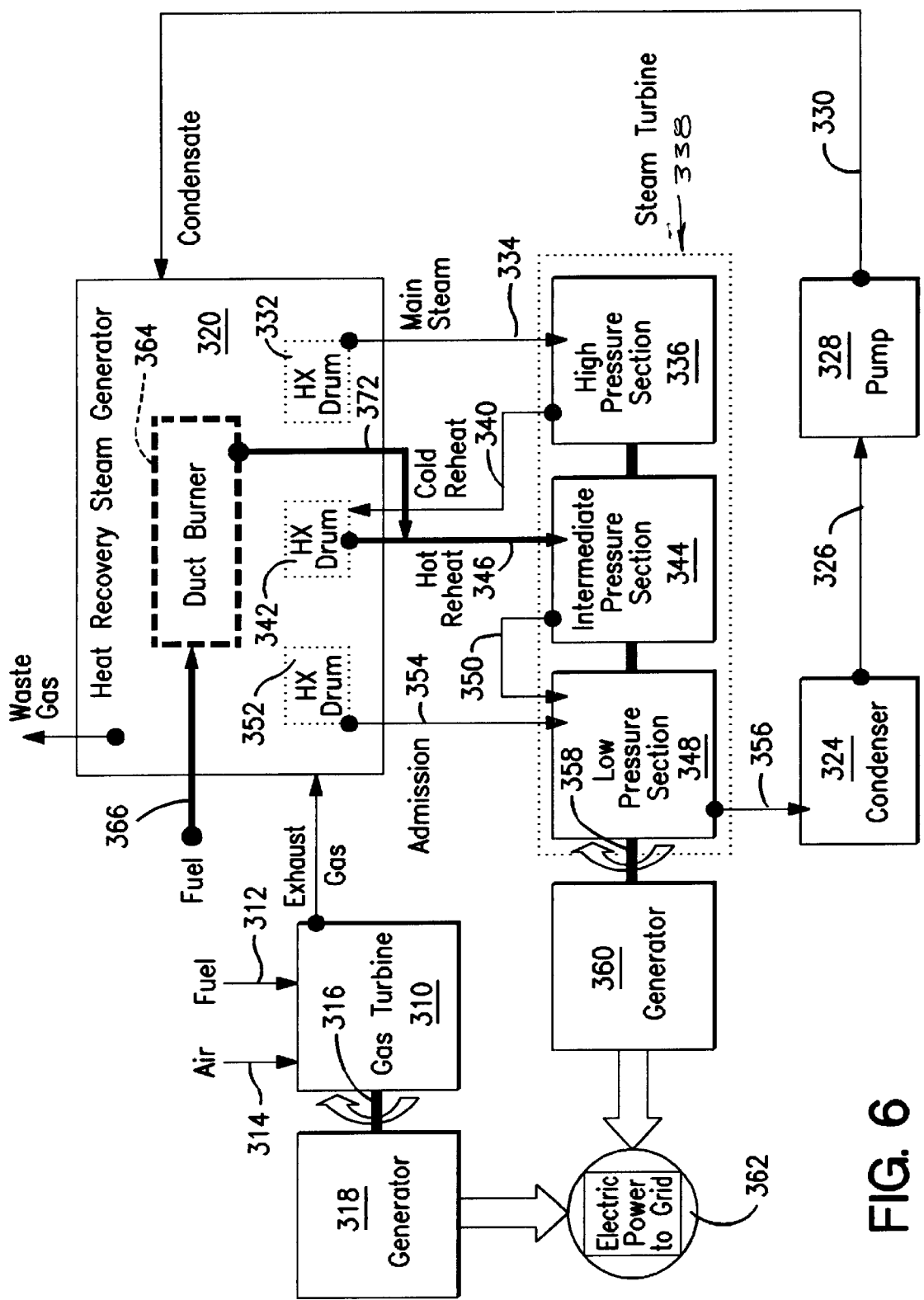
FIG. 6; is a schematic block diagram of a combined cycle power plant with supplemental firing capability and bypass system in accordance with a second embodiment of the invention.

FIGS. 5 and 6 show two examples of bypass arrangements in accordance with the invention. Conventional combined cycle steam is produced in the HRSG, using exhaust heat from the gas turbine, and is introduced to the HP inlet. This steam is at the maximum rated pressure for the HP.

In FIG. 5, reference numerals similar to those used in FIG. 3, but with the prefix "2" added, are employed to designate corresponding components. In FIG. 5, there is only one significant difference as compared to FIG. 3. Specifically, supplemental steam generated by the duct burner 264 is introduced to the HP steam turbine section 236, not at the HP inlet (see stream 234), but rather at a nozzle(s) located at a downstream stage(s) of the HP inlet, as indicated by the stream 270. In other words, the steam from duct burner 264 bypasses the HP section inlet supplied by stream 234. This supplemental steam is thus introduced at a pressure that is equal to or less than the maximum rated HP inlet pressure. As such, it does not violate the maximum allowable pressure for the HP section but is sufficient to drive the additional flow through the remainder of the turbine 238. Actual required steam pressure may be controlled either directly in the supplemental duct firing system or by subsequent conditioning of the steam flow (for example, via throttling or some other means of pressure reduction). Maximum turbine efficiency is maintained at 100% operation with a small degradation in efficiency at the maximum fired condition, where turbine efficiency is less important than total power output.

In FIG. 6, reference numerals similar to those used in FIG. 3, but with the prefix "3" added, are employed to designate corresponding components. FIG. 6 shows a similar scheme as in FIG. 5 wherein supplemental steam is generated in the HRSG 320 by a duct burner 364 but now bypasses the HP steam turbine section 336 altogether. Instead, the supplemental steam is now mixed with the hot reheat steam and introduced to the inlet of the IP steam turbine section 344 via streams 372 and 346 (from the drum 342), and is subsequently available to generate additional power in the IP and LP steam turbine sections 344, 348, respectively. Again, actual required steam pressure may be controlled either directly in the supplemental duct firing system or by subsequent conditioning of the steam flow. As in the embodiment illustrated in FIG. 5, maximum turbine efficiency is maintained at 100% operation with a small degradation in efficiency at the maximum fired condition.

Figure 7:
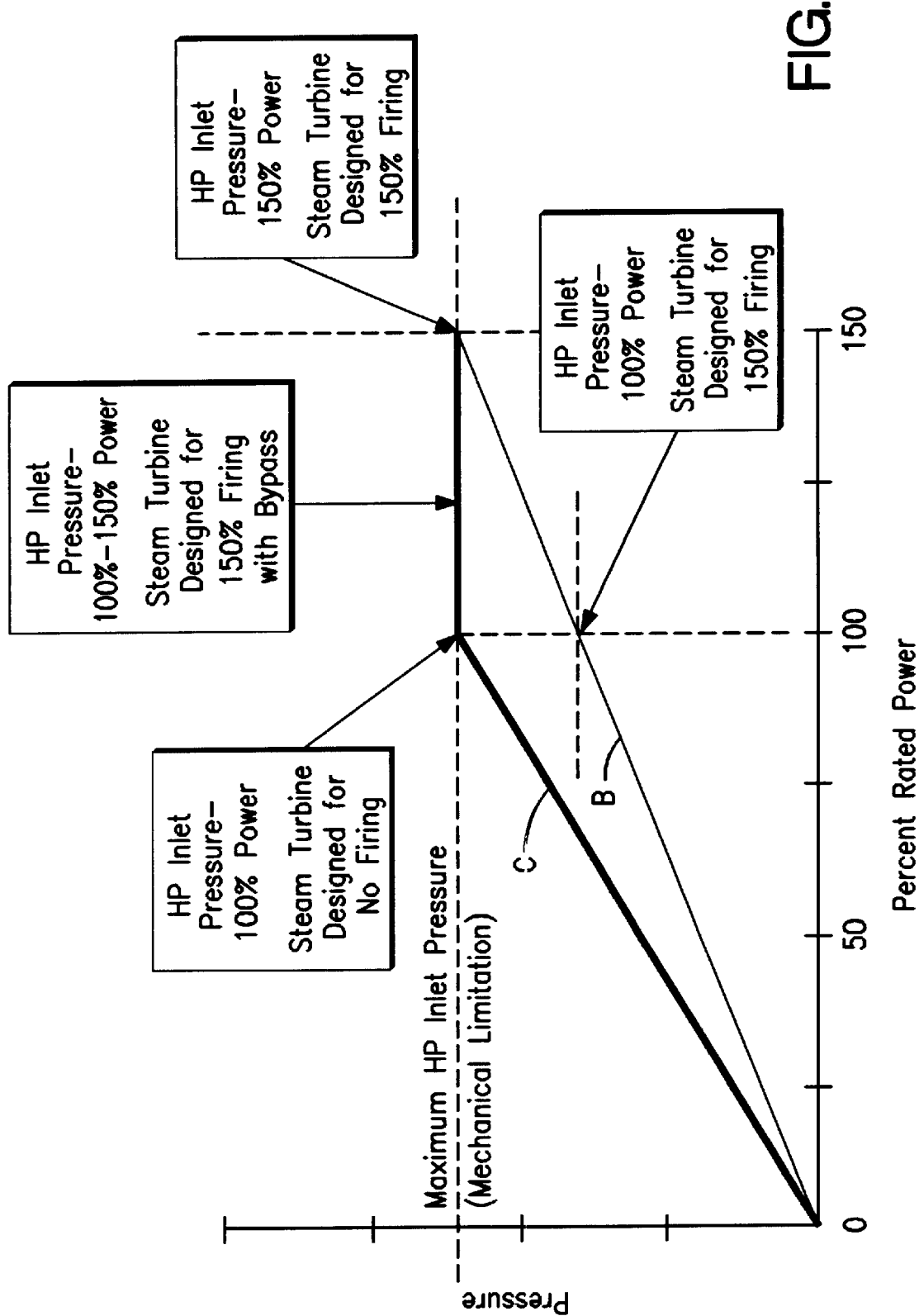
FIG. 7 is a diagram illustrating the relationship between power output and steam turbine high pressure section inlet pressure for a sliding pressure combined cycle power plant with supplemental firing capability and bypass system.

FIG. 7 shows the pressure/power relationship for a combined cycle power plant with supplemental firing and the bypass system of this invention. This Figure applies to both examples discussed above and shown in FIGS. 5 and 6. FIG. 7 shows that combined cycle steam turbines equipped with the bypass system (see line C) invention can (1) be operated at maximum efficiency for the zero to 100% power range (similar to the unfired design shown in FIG. 2), and (2) retain the ability to provide supplemental power using duct fired steam for peaking demand. FIG. 7 also shows line B from FIG. 4 for comparative reference.

The invention as described above thus permits optimization of the performance of a steam turbine during unfired (non-peak output) periods, while at the same time, increasing the potential output of a given steam turbine when additional steam is admitted during fired (peak output) periods.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. Further, although the descriptions provided herein apply to a three-pressure reheat multi-shaft combined cycle power plant, the fundamental principles apply equally to single or dual pressure reheat cycles and/or to single-shaft arrangements or variations thereof.

What is claimed is:

1. A combined cycle power plant comprising:

a gas turbine driving a first generator;

a steam turbine driving a second generator, said steam turbine having a low pressure section, an intermediate pressure section and a high pressure section;

a heat recovery steam generator arranged to receive exhaust gas from said gas turbine and condensate from said steam turbine, and to utilize the exhaust gas from said gas turbine to convert condensate from said steam turbine back to steam, said heat recovery steam generator having means for supplying steam to the high pressure, intermediate pressure and low pressure sections of the steam turbine; said heat recovery steam generator further comprising a duct burner for providing heat required to generate supplemental steam in said heat recovery steam generator for said steam turbine; and means for supplying said supplemental steam to said steam turbine downstream of a high pressure inlet to said high pressure section.

2. The combined cycle power plant of claim 1 wherein the supplemental steam is supplied to said high pressure section of said steam turbine, downstream of said high pressure inlet.

3. The combined cycle power plant of claim 1 wherein the supplemental steam is supplied to said intermediate pressure section of said steam turbine.

4. The combined cycle power plant of claim 2 wherein said supplemental steam is supplied upstream of a cold reheat steam outlet in said high pressure section.

5. The combined cycle plant of claim 3 wherein said supplemental steam is mixed with hot reheat steam from a drum in said heat recovery steam generator prior to admission into said intermediate pressure section.

6. A method of operating a combined cycle power plant having a gas turbine driving a first generator; a steam turbine driving a second generator, said steam turbine having a low pressure section, an intermediate pressure section and a high pressure section; and a heat recovery steam generator arranged to receive exhaust gas from the gas turbine and condensate from the steam turbine, and to utilize the exhaust gas from the gas turbine to convert condensate from the steam turbine back to steam, said heat recovery steam generator having means for supplying steam to the high pressure, intermediate pressure and low pressure sections of the steam turbine; the method comprising:

a) providing a duct burner in the heat recovery steam generator for providing heat required to generate supplemental steam; and b) firing the duct burner and supplying the supplemental steam to said steam turbine downstream of a high pressure inlet to said high pressure section.

7. The method of claim 6 wherein step b) is activated only in peak output periods.

8. The method of claim 6 wherein the supplemental steam is supplied to said high pressure section of said steam turbine, downstream of said high pressure inlet.

9. The method of claim 6 wherein the supplemental steam is supplied to said intermediate pressure section of said steam turbine.

10. The method of claim 8 wherein said supplemental steam is supplied upstream of a cold reheat steam outlet in said high pressure section.

11. The method of claim 9 wherein said supplemental steam is mixed with hot reheat steam from a drum in said heat recovery steam generator prior to admission into said intermediate pressure section.

* * * * *

UNITED STATES PATENT AND TRADEMARK OFFICE
CERTIFICATE OF CORRECTION

PATENT NO.    : 6,442,924 B1
DATED         : September 3, 2002
INVENTOR(S)   : Talley et al.

It is certified that error appears in the above-identified patent and that said Letters Patent is hereby corrected as shown below:

<u>Column 1,</u>
Line 13, delete "(HRSGS)" and insert -- (HRSGs) --.

Signed and Sealed this

Fifteenth Day of October, 2002

*Attest:*

*Attesting Officer*

JAMES E. ROGAN
*Director of the United States Patent and Trademark Office*